US 6,469,813 B1

(12) United States Patent
Leclerc et al.

(10) Patent No.: US 6,469,813 B1
(45) Date of Patent: Oct. 22, 2002

(54) REDUCING COLLISION-INDUCED JITTER BY WAVELENGTH INTERCHANGE IN AN OPTICAL FIBER TRANSMISSION SYSTEM USING SOLITON SIGNALS AND WAVELENGTH DIVISION MULTIPLEXING

(75) Inventors: Olivier Leclerc, Saint Michel sur Orge (FR); Sébastien Bigo, Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/198,056

(22) Filed: Nov. 23, 1998

(30) Foreign Application Priority Data

Nov. 27, 1997 (FR) .............................. 97 14907

(51) Int. Cl.⁷ ............................................... H04J 14/02
(52) U.S. Cl. ........................................ 359/124; 359/127
(58) Field of Search .................... 359/127, 124, 359/161, 173, 349

(56) References Cited

U.S. PATENT DOCUMENTS

| | | | | |
|---|---|---|---|---|
| 4,807,227 A | * | 2/1989 | Fujiwara et al. ................ 370/3 |
| 5,365,362 A | | 11/1994 | Gnauck et al. .............. 359/174 |
| 5,710,649 A | * | 1/1998 | Mollenauer .................. 359/123 |
| 5,786,916 A | * | 7/1998 | Okayama et al. ............ 359/128 |
| 5,825,517 A | * | 10/1998 | Antoniades et al. ......... 359/117 |
| 6,002,504 A | * | 12/1999 | Tillerot et al. .............. 359/172 |
| 6,011,638 A | * | 1/2000 | Mamyshev et al. .......... 359/179 |
| 6,025,943 A | * | 2/2000 | Meekers et al. ............. 359/128 |
| 6,043,927 A | * | 3/2000 | Islam ........................... 359/332 |
| 6,243,181 B1 | * | 6/2001 | Golovchenko et al. ...... 359/161 |

FOREIGN PATENT DOCUMENTS

| GB | 2 277 651 A | | 11/1994 |
|---|---|---|---|
| JP | 2000008346 | * | 8/2000 |

OTHER PUBLICATIONS

Patent Abstracts of Japan, vol. 012, No. 239 (E–630), Jul. 7, 1998 corresponding to JP 63 030092 A (Fujitsu LTD) Feb. 8, 1988.

R. Schnabel et al, "Polarization Insensitive Frequency Conversion of a 10–Channel OFDM Signal using Four–Wave-Mixing in a Semiconductor Laser Amplifier", IEEE Photonics Technology Letters, vol. 6, No. 1, Jan. 1, 1994, pp. 56–58.

* cited by examiner

Primary Examiner—Leslie Pascal
Assistant Examiner—Dalzid Singh
(74) Attorney, Agent, or Firm—Sughrue Mion, PLLC

(57) ABSTRACT

The invention relates to an optical fiber transmission system using soliton signals and wavelength division multiplexing. To reduce the effects of collision-induced jitter on the soliton channels, the invention proposes to interchange the wavelengths of the channels of the multiplex at least once, so as to invert the sign of the residual frequency variation induced by the asymmetrical collisions on the signals of the channels. The invention is applicable in particular to transmission systems implementing a frequency allocation scheme that guarantees that the bit times of the various channels are synchronous at regular intervals.

22 Claims, 1 Drawing Sheet

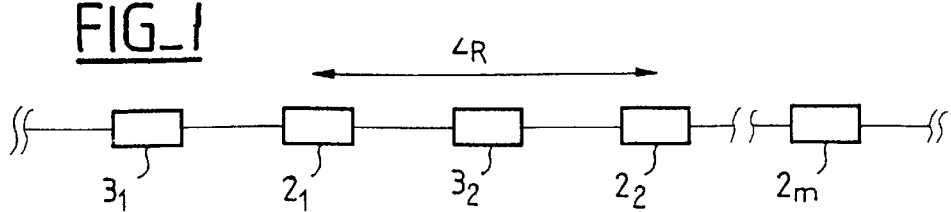
FIG_1
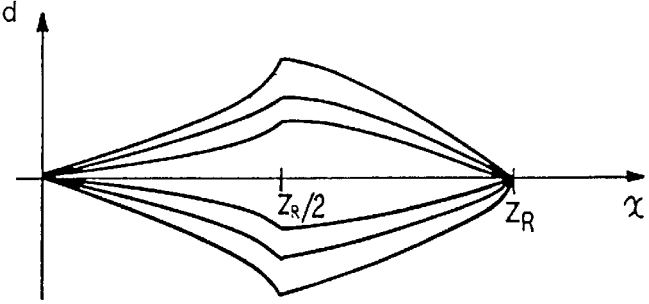
FIG_2
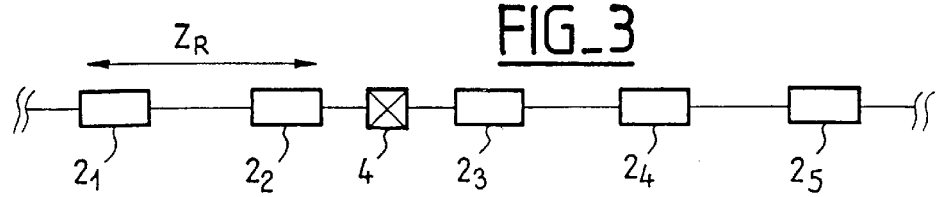
FIG_3
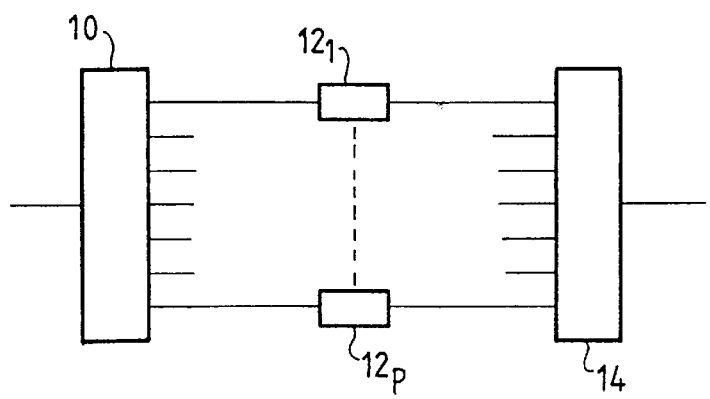
FIG_4
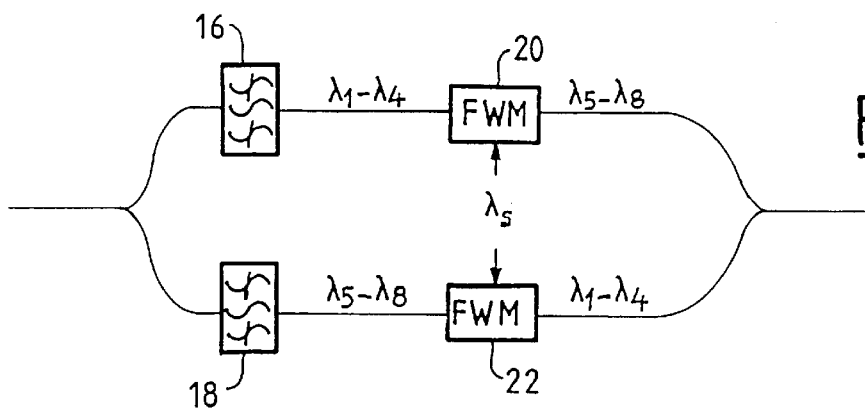
FIG_5

REDUCING COLLISION-INDUCED JITTER BY WAVELENGTH INTERCHANGE IN AN OPTICAL FIBER TRANSMISSION SYSTEM USING SOLITON SIGNALS AND WAVELENGTH DIVISION MULTIPLEXING

The present invention relates to an optical fiber transmission system using soliton signals and wavelength division multiplexing, and to a method of transmission in such a system, the system and the method making it possible to reduce the effects of collision-induced jitter. It also relates to a method and a device for interchanging wavelengths in an optical fiber transmission system using soliton signals and wavelength division multiplexing.

BACKGROUND OF THE INVENTION

It is known that soliton impulses or "solitons" can be transmitted in that portion of an optical fiber which has abnormal dispersion. Soliton signals are pulse signals having waveform of the $sech^2$ type. With that type of pulse, the non-linearity in the corresponding portion of the fiber compensates for the dispersion of the optical signal. Soliton transmission is modelled in known manner by the non-linear Schrodinger equation.

Transmission of such pulses is limited by various effects, such as jitter induced by the solitons interacting with the noise present in the transmission system, as described, for example, in the article by J. P. Gordon and H. A. Haus, Optical Letters, vol. 11, No. 10, pages 665–667. That effect, known as the "Gordon-Haus effect" or as "Gordon-Haus jitter", sets a theoretical limit on the quality or on the data rate of soliton transmission.

In order to overcome those limits, it is possible to perform synchronous modulation on the soliton signals, by means of semiconductor modulators. Systems using sliding guiding filters have also been proposed, making it possible to control the jitter of the transmitted solitons, e.g. as described in EP-A-0 576 208. In order to regenerate the signal in-line, it has also been proposed to use the Kerr effect in synchronous amplitude or phase modulators, or to use saturable absorbents.

In addition, to increase the data rate of optical fiber transmission systems using soliton signals, it has also been proposed to use wavelength division multiplexing (WDM). In which case, it is considered to be advantageous to use sliding guiding filters of the Fabry Perot type, which filters are entirely compatible with wavelength division multiplexed signals. However, the use of synchronous modulators or of saturable absorbants for regenerating wavelength division multiplexed soliton signals is problematic because of the different group velocities between the signals of the various channels.

An article by E. Desurvire, O. Leclerc, and O. Audouin, Optics Letters, vol. 21, No. 14, pages 1026–1028 describes a wavelength allocation scheme which is compatible with the use of synchronous modulators. That article proposes allocating wavelengths to the various channels of the multiplex in a manner such that, for given intervals $Z_R$ between the repeaters, the signals of the various channels, or more exactly the bit times of the various channels of the multiplex, are substantially synchronized on arriving at the repeaters. Synchronous modulation can thus be performed in-line on all of the channels, at given intervals, by means of discrete synchronous modulators. That technique for allocating the wavelengths of the multiplex is also described in French Patent Application 96 00732 of Jan. 23, 1996 in the name of Alcatel Submarine Networks. The article proposes selecting a sub-group of channels which are synchronous not only at intervals $Z_R$, but also at intervals that are sub-multiples of $Z_R$. Other aspects of that technique for allocating wavelengths are described in an article by O. Leclerc, E. Desurvire and O. Audouin entitled "Synchronous WDM Soliton Regeneration: Toward 80–160 Gbit/s Transoceanic Systems", Optical Fiber Technology, 3, pages 97–116 (1997), and in an article by E. Desurvire et al entitled "Transoceanic Regenerated Soliton Systems: Designs for over 100 Gbit/s Capacities", Suboptic '97, pages 438–447.

An article by L. F. Mollenauer, S. G. Evangelides, and P. J. Gordon entitled "Wavelength Division Multiplexing with Solitons in Ultra Long Distance Transmissions using Lumped Amplifiers", Journal of Lightwave Technology, vol 9, No. 3, pages 362–367 (1991) describes the problem of collisions between solitons in wavelength division multiplexing systems, and emphasizes in particular the variations in propagation velocity induced by such collisions. At the output of the transmission system, such variations can induce unacceptable jitter on the solitons. That article explains that variations in the chromatic dispersion of the fiber along the transmission path can compensate for the effects of collisions. It is therefore proposed to use segments of different dispersion to compensate for the effects of collisions on the propagation velocity of the solitons, in a transmission system in which the distance between amplifiers is short compared with the length of the collisions.

That solution is difficult to apply on an industrial scale because of the constraints on managing the fibers, and because of the short spacing between the amplifiers. In addition, it is not applicable to WDM transmission systems that use wavelength allocation schemes of the type mentioned above, insofar as the variations in the dispersion of the fiber disturb the bit time synchronism at the synchronous regenerators.

An article by A. Hasegawa, S. Kumar, and Y. Kodoma entitled "Reduction of Collision-Induced Time-Jitter in Dispersion-Managed Soliton Transmission Systems", Optics Letters, vol. 21, No. 1, January 1996, pages 39–41 proposes a scheme for managing in-fiber dispersion, which scheme makes it possible to increase the distance between amplifiers. That solution relies on a stepped dispersion profile in the fiber, which profile is as close as possible to an exponential ideal profile. That solution cannot be implemented industrially, and using it with the above-mentioned frequency allocation scheme is problematic.

OBJECTS AND SUMMARY OF THE INVENTION

An object of the invention is to provide a solution to the problem of managing collisions between solitons in a transmission system using wavelength division multiplexing, which solution avoids the need to cause the dispersion profile of the transmission fiber to vary along the transmission system. The invention is particularly advantageous in WDM transmission systems in which the wavelengths are chosen in a manner such that the bit times of the various channels are synchronous at given intervals. The invention proposes such a solution that is simple, and that limits time jitter due to collisions between solitons.

More precisely, the invention provides an optical fiber transmission system using wavelength division multiplexing and soliton signals, said system including, at least once, interchange means for interchanging the wavelengths of at least two channels, so as to change the sign of the residual frequency variation induced by asymmetrical collisions on the signals of said channels.

In an embodiment, the wavelengths ($\lambda_1$ to $\lambda_n$) of the various channels of the multiplex constitute a set comprising a bottom half and a top half, and the interchange means interchange the wavelengths of at least two channels so that the signals transmitted on a wavelength from one of said halves are transmitted on a wavelength from the other of said halves.

In which case, it is possible for the interchange means to perform wavelength interchange in a manner such that the signals transmitted on a wavelength $\lambda_i$ from one of said halves are transmitted on a wavelength $\lambda_{n-i+1}$ from the other of said halves, where i is an integer taking at least one value in the range 1 to n.

Advantageously, the interchange means further interchange the wavelengths such that the signals transmitted on a wavelength $\lambda_{n-i+1}$ from one of said halves are transmitted on a wavelength $\lambda_i$ from the other of said halves.

The integer i may take all of the possible values in the range 1 to n.

In an embodiment, the transmission system includes single interchange means disposed substantially in the middle of the transmission system.

In another embodiment, the system includes a plurality of interchange means spaced apart along the transmission system.

The invention also provides a method of transmitting soliton signals using wavelength division multiplexing, said method including at least one wavelength interchange step in which the wavelengths of at least two channels are interchanged, so as to change the sign of the residual frequency variation induced by asymmetrical collisions on the signals of said channels.

Preferably, the wavelengths ($\lambda_1$ to $\lambda_n$) of the various channels of the multiplex constitute a set comprising a bottom half and a top half, and the channel-interchange step takes place such that the signals transmitted on a wavelength from one of said halves are transmitted on a wavelength from the other of said halves.

The wavelength interchange advantageously takes place in a manner such that the signals transmitted on a wavelength $\lambda_i$ from one of said halves are transmitted on a wavelength $\lambda_{n-i+1}$ from the other of said halves, where i is an integer taking at least one value in the range 1 to n.

The interchange step may further comprise interchanging the wavelengths in a manner such that the signals transmitted on a wavelength $\lambda_{n-i+1}$ from one of said halves are transmitted on a wavelength $\lambda_i$ from the other of said halves.

Advantageously, the integer i takes all of the possible values in the range 1 to n.

The method may comprise a single interchange step which takes place after substantially one half of the propagation time.

The method may also comprise a plurality of interchange steps.

The invention further provides the use of such a method to reduce collision-induced jitter.

The invention also provides a wavelength interchange device, comprising:

demultiplexer means for demultiplexing a wavelength division multiplex of soliton signals, which means deliver a plurality of channels at wavelengths ($\lambda_1$ to $\lambda_n$), said wavelengths constituting a set formed by a bottom half and by a top half;

at least two wavelength converters for interchanging the wavelength of a channel chosen from one of said halves and the wavelength of a channel chosen from the other of said halves; and multiplexer means for re-multiplexing the channels.

In an embodiment, the converters perform the wavelength interchange in a manner such that the signals received on a wavelength $\lambda_i$ from one of said halves are transmitted on a wavelength $\lambda_{n-i+1}$ from the other of said halves, and vice versa, where i is an integer taking at least one value in the range 1 to n.

Preferably, the device includes 2Int(n/2) converters, where n is the number of channels.

The invention further provides a method of interchanging wavelengths in a wavelength division multiplex of soliton signals, the wavelengths ($\lambda_1$ to $\lambda_n$) constituting a set formed by a bottom half and by a top half, said method comprising:

a step of demultiplexing the channels of the multiplex;

a step of interchanging the wavelengths of at least one channel chosen from one of said halves and of at least one channel chosen from the other of said halves; and a step of re-multiplexing the channels.

The interchange step advantageously comprises interchanging a wavelength $\lambda_i$ from one of said halves and a wavelength $\lambda_{n-i+1}$ from the other of said halves, where i is an integer taking at least one value in the range 1 to n.

Preferably, the integer i takes all of the values in the range 1 to Int(n/2), where n is the number of channels.

The invention further provides a device for interchanging wavelengths within a wavelength division multiplex of soliton signals, the wavelengths ($\lambda_1$ to $\lambda_n$) of the multiplex constituting a set formed by a bottom half and by a top half, said device comprising:

means for separating the multiplex into first and second signals, the first signal comprising the channels whose wavelengths belong to one half, and the second signal comprising the channels whose wavelengths belong to the other half;

first conversion means for converting the wavelengths of the channels of the first signal into wavelengths of said other half;

second conversion means for converting the wavelengths of the channels of the second signal into wavelengths of said one half; and combination means for combining the signals delivered by said first and second conversion means.

Advantageously, said first and second conversion means comprise four-wave mixers for conjugating the signals about a middle frequency ($\lambda_1+\lambda_n$)/2 midway between the end frequencies of the multiplex.

In which case, said first conversion means further comprise filters for filtering wavelengths other than those of said other half and said second conversion means further comprise filters for filtering wavelengths other than those of said one half, or vice versa.

Finally, the invention provides a method of interchanging wavelengths within a wavelength division multiplex of soliton signals, the wavelengths ($\lambda_1$ to $\lambda_n$) of the multiplex constituting a set formed by a bottom half and by a top half, said method comprising:

a step of separating the multiplex into first and second signals, the first signal comprising the channels whose wavelengths belong to one half, and the second signal comprising the channels whose wavelengths belong to the other half;

a step of converting the wavelengths of the channels of the first signal into wavelengths of said other half;

a step of converting the wavelengths of the channels of the second signal into wavelengths of said one half; and a step of combining the first and second signals as converted.

Preferably, the conversion step comprises conversion by four-wave mixing to conjugate the signals about a middle frequency $(\lambda_1+\lambda_n)/2$ midway between the end frequencies of the multiplex.

In which case, the conversion step advantageously further comprises a filtering step after the four-wave mixing step.

BRIEF DESCRIPTION OF THE DRAWING

Other characteristics and advantages of the invention appear on reading the following description of embodiments of the invention, given by way of example and with reference to the accompanying drawing, in which:

FIG. 1 diagrammatically shows a first embodiment of a transmission system of the invention;

FIG. 2 shows the appearance of the collision-induced jitter $\Delta_t$ between two repeaters, over an interval $Z_R$ of the transmission system;

FIG. 3 shows another embodiment of the transmission system of the invention;

FIG. 4 shows a wavelength interchange device of the invention, and

FIG. 5 shows another example of a wavelength interchange device of the invention.

MORE DETAILED DESCRIPTION

The invention applies to an optical fiber transmission system using soliton signals and wavelength division multiplexing. The invention is described below with reference to a system in which the various wavelengths of the multiplex are chosen such that, over a given interval, the relative slip between the various channels is substantially equal to a multiple of the bit time. However, the invention is not limited to a transmission system implementing such a frequency allocation scheme, and it applies more generally to any transmission system using soliton signals and wavelength division multiplexing.

In the example proposed, it is possible to use the wavelength allocation solutions described in the above-mentioned articles by E. Desurvire and O. Leclerc. Those articles are incorporated by way of reference into the present description for the purposes of describing the wavelength allocation schemes. Such a wavelength allocation scheme ensures that, at regular intervals $Z_R$ along the fiber, the relative slip between the various channels is substantially equal to a multiple of the bit time.

The problem in a transmission system using wavelength division multiplexing, and in particular in a system using such a wavelength allocation scheme, is that collisions between the soliton signals in the amplifiers or more generally in any asymmetrical device of the system induce a variation in the frequency of the solitons. This variation results in time jitter on arrival. The sign of the frequency variation depends on the relative position in the spectrum of the soliton signals that collide. By way of example, if consideration is given to two trains of solitons at wavelengths $\lambda_1$ and $\lambda_2$, where $\lambda_1<\lambda_2$, the collision between the soliton signals of the train at $\lambda_1$ (the faster train) and the signals of the train at $\lambda_2$ causes an increase in the wavelength of the train of solitons at $\lambda_2$ by a quantity $\Delta\lambda$, and a reduction in the wavelength of the train at $\lambda_1$ by the same quantity.

The variation in wavelength $\Delta\lambda$ caused by a collision is given, for example, in Reference Document "WDM with solitons in ultra-long distance transmission using lumped amplifiers", by Mollenauer et al, Journ. of Light. Tech., vol 9, No. 3, March 1991. Said variation in wavelength depends on the asymmetry of the collision, i.e. on the position of the amplifier relative thereto.

The invention is based on the fact that this variation in wavelength accelerates the faster solitons, i.e. those whose wavelength is shorter, and slows down the slower solitons, i.e. those whose wavelength is longer. In order to compensate for the effects of the collisions, the invention proposes to interchange the wavelengths of the channels of the multiplex, at least once, in order to change the sign of the residual frequency variation induced by the asymmetrical collisions on a channel.

The result of wavelength interchange (changing the sign of the residual frequency variation) can be verified directly and easily merely by applying the above-mentioned formula.

The invention proposes various ways of implementing such interchange: in particular it may be performed for all of the channels, or merely for some of them, as described below.

The effect of interchanging the channels is, on average, to reduce the residual frequency variation at the end of the link, which variation is the sum of the variations undergone over the entire link. This causes a reduction, on average, in the collision-induced jitter. Naturally, the exact reduction in the jitter depends on the data present on the link, and more precisely on the presence of soliton pulses ("1s") on the channels subjected to collision.

FIG. 1 shows a first embodiment of the invention. As explained above, a wavelength allocation scheme is used that ensures that the bit times of the various channels are synchronous or quasi-synchronous at regular intervals, referenced $Z_R$. Along the transmission system, a plurality of repeaters $2_1$ to $2_m$ are provided, e.g. spaced apart by $Z_R$, as described above. In the embodiment shown in FIG. 1, the channels are interchanged between each of the pairs of adjacent repeaters, at equal distance from each of the repeaters: the transmission system also includes a plurality of channel-interchange devices $3_1$ to $3_m$. For example, each device interchanges all of the channels of the multiplex, by causing the signals received on the channel of wavelength $\lambda_i$ to be transmitted on a wavelength $\lambda_{n+i+1}$, and to do so for all of the possible values of i in the range 1 to n. If n is even, this means that the wavelengths of the channels are interchanged such that each of the channels transmitted on a wavelength in the bottom half $[\lambda_1, \lambda_{n/2}]$ is transmitted over a wavelength in the top half $[\lambda_{n/2+1}, \lambda_n]$, and vice versa. If n is odd, then the wavelengths of the bottom half $[\lambda_1, \lambda_{(n-1)/2}]$ are interchanged with the wavelengths of the top half $[\lambda_{(n+3)/2}, \lambda_n]$; the channel of wavelength $\lambda(n+i)/2$ can be left unchanged.

FIG. 2 shows the appearance of the collision-induced jitter $\Delta t$ between two repeaters, over an interval $Z_R$ of the transmission system. The y-axis is used to plot the collision-induced jitter for the signals of the various channels of the multiplex, while the x-axis is used to plot the distance along transmission system. The figure shows that, starting from a repeater with zero collision-induced jitter, the collision-induced jitter increases progressively and exponentially as a function of distance, for the various channels, until the distance $Z_R/2$ is reached, i.e. until the position of the wavelength interchange device is reached. After this point along the x-axis, i.e. after the signal has passed through the wavelength interchange device, the sign of the residual frequency variation induced by the asymmetrical collisions on the signals changes so that the total jitter on the signals decreases. This appears in FIG. 2, in which the jitter of all of the signals decreases and is substantially zero at the point $Z_R$ on the x-axis. In FIG. 2, the signals for which the collision-induced jitter is positive are the signals of the channels whose wavelengths are initially in the top half $[\lambda_{n/2+1}, \lambda_n]$ of the set of wavelengths; the residual wavelength variation on the signals of these channels is positive over the first half of the path, before the wavelength interchange means are reached. After the wavelengths have been interchanged, the signals are conveyed on wavelengths from the bottom half of the set of wavelengths $[\lambda_1, \lambda_{n/2-1}]$; in this portion of the link, the collision-induced jitter is negative and causes the cumulative value to decrease as shown in FIG. 2. Conversely, the signals for which the collision-induced jitter is positive are the signals of the channels whose wavelengths are initially in the bottom half $[\lambda_1, \lambda_{n/2-1}]$ of the set of wavelengths; the residual wavelength variation on the signals of these channels is negative over the first half of the path, before the wavelength interchange means are reached, and is positive over the second half of the path.

FIG. 3 shows another embodiment of the invention. The transmission system is similar to that shown in FIG. 1, except that it includes only one wavelength interchange device 4, e.g. situated in the middle of the link. This solution is particularly cheap, and may be implemented preferably when the cumulative collision-induced jitter over the first half of the link is low enough not to be detrimental.

Clearly all possible variations on the number of wavelength interchange devices may be considered. It is possible to vary the number of devices in the range 1 to n, or even beyond by providing a plurality of interchange devices between two repeaters. In fact, the number of repeaters and the number of wavelength interchange devices are not related.

In addition, it is not essential to interchange the signals of all of the channels in order to implement the invention. As shown in FIG. 2, the effect of the collisions is greater on the channels that are situated at the end of the spectrum. It can suffice to interchange the channels at the end of the spectrum, without interchanging the entire set of channels. By way of example, in a multiplex having 8 channels, it is possible to interchange the wavelengths of the channels of orders 1 & 2 and 7 & 8, without acting on the channels of orders 3 to 6. This limits the action taken on the channels, and reduces the cost and the complexity of the interchange devices. It is thus possible to interchange the wavelengths of only two channels, as a function of the expected effects of the collisions.

FIG. 4 shows a wavelength interchange device of the invention. The device comprises a demultiplexer 10 receiving the multiplex and delivering the various channels at its outputs. The signals delivered by the demultiplexer are transmitted to wavelength converters $12_1$ to $12_p$. Each of these converters converts the wavelength of the signals that it receives. It is possible to use semiconductor optical amplifiers (SOAs) or four-wave mixers (FWMs). If the set of wavelengths comprises a bottom half and a top half, with, in addition, the center wavelength when the number of channels is odd, then the converters advantageously change the wavelengths so that signals that are received on a wavelength in one of the halves are delivered at the output of the converter on a wavelength in the other half. The signals delivered at the outputs of the converters are then re-multiplexed in a multiplexer 14.

As explained above, it is possible to interchange the wavelengths on only some of the channels. In which case, it is clearly not necessary for the demultiplexing means to demultiplex those channels on which no wavelength interchange is to take place, e.g. the channels 3 to 6 in the example given above. The means for re-multiplexing the channels then receive not only the signals delivered by the converters but also the channels that have not undergone any change in wavelength.

As explained above, in an embodiment of the invention, the converters perform wavelength interchange such that the signals received on a wavelength $\lambda_i$ are transmitted on a wavelength $\lambda_{n-i+1}$, and vice versa. In which case, i is an integer taking at least one value in the range 1 to n, and preferably all possible values.

If the number n of channels is even, then, for example, n converters are provided for interchanging the wavelengths of the entire set of channels. If the number n of channels is odd, the wavelength of the center channel of the multiplex is not affected, and it is possible to provide n–1 converters for interchanging the wavelengths of the other channels. In general, there are 2Int(n/2) converters for interchanging the maximum number of channels.

If certain channels are not subjected to wavelength interchange, it is possible to provide them with delay means in order to maintain the synchronism of the bit times, when the frequency allocation scheme is as mentioned above.

FIG. 5 shows another example of a wavelength interchange device of the invention. The FIG. 5 device operates by four-wave mixing one half of the channels of the multiplex, so as to change the wavelengths of one half of the channels in a single step. With reference to FIG. 5, the example of a multiplex having 8 channels is described, and the first half of the wavelengths is referred to as "$\lambda_1$ to $\lambda_4$", and the second half of wavelengths is referred to as "$\lambda_5$ to $\lambda_8$".

The device shown in FIG. 5 includes, at its input, means for separating the multiplex into first and second signals, the first signal comprising the channels whose wavelengths belong to the first half, and the second signal comprising the channels whose wavelengths belong to the second half. For example, these means may comprise two filters 16 and 18 receiving the multiplex and filtering the signals respectively of the first half and of the second half.

The first and second signals are then delivered to four-wave mixers 20 and 22. These mixers also receive a signal at a center wavelength $\lambda_s$, serving for performing the four-wave mixing. In the example shown, this wavelength is equal to $(\lambda_1+\lambda_8)/2$.

The four-wave mixer 20 receiving the channels of wavelengths $\lambda_1$ to $\lambda_4$ and the signal at $\lambda_s$ delivers signals of wavelengths $2\lambda_s-\lambda_4, 2\lambda_s-\lambda_3, 2\lambda_s-\lambda_2, 2\lambda_s-\lambda_1$, i.e. symmetrical to the original wavelengths about the wavelength $\lambda_s$, Where applicable, the other signals delivered by the four-wave mixer are filtered. In view of the choice of $\lambda_s$, it appears that the signals initially received on the wavelengths $\lambda_1$ to $\lambda_4$ are transmitted on the wavelengths $\lambda_8$ to $\lambda_5$.

In the same way, the four-wave mixer 22 receiving the signals on the wavelengths $\lambda_5$ to $\lambda_8$ delivers signals of wavelengths $\lambda_4$ to $\lambda_1$.

The signals delivered by the four-wave mixers are then combined to re-form an eight-channel multiplex.

The circuit shown in FIG. 5 makes it possible for one half of the channels to be processed as a whole in each of the mixers. Unlike in the embodiment shown in FIG. 4, it is not necessary to provide one converter per channel. Clearly, the circuit shown in FIG. 5 may be adapted and is not limited to eight channels. When the number of channels is odd, the center channel may be transmitted directly, without going through one of the four-wave mixers. As in the preceding circuit, it is possible to choose to interchange wavelengths for only some of the channels, e.g. those channels situated at the ends of the spectrum.

Naturally, the invention is not limited to the embodiments described by way of example. The wavelength allocation scheme is in no way limited to the examples described. It should also be noted that, relative to the embodiments described, it is possible to add or to omit filters or amplifiers, as a function of needs. Finally, the invention is described when transmission is one-way. Naturally, it also applies to both-way transmission.

What is claimed is:

1. An optical fiber transmission system using wavelength division multiplexing and pulsed optical signals, said system including, at least once, means for reducing collision induced intensity distortions and phase jitter by interchanging the wavelengths of at least two channels, so as to change the sign of the residual frequency variation induced by asymmetrical collisions on the signals of said channels.

2. A transmission system according to claim 1, wherein the wavelengths of the various channels of the multiplex constitute a set comprising a bottom half and a top half, and wherein the means for reducing collision induced intensity distortions and phase jitter interchanges the wavelengths of at least two channels so that the signals transmitted on a wavelength from one of said halves are transmitted on a wavelength from the other of said halves.

3. A transmission system according to claim 2, wherein the means for reducing collision induced intensity distortions and phase jitter performs said wavelength interchange in the manner such that the signals transmitted on a wavelength $\lambda_i$ from one of said halves are transmitted on a wavelength $\lambda_{n-i+1}$ from the other of said halves, where i is an integer taking at least one value in the range 1 to n.

4. A transmission system according to claim 3, wherein the means for reducing collision induced intensity distortions and phase jitter further interchanges the wavelengths such that the signals transmitted on a wavelength $\lambda_{n-i+1}$ from one of said halves are transmitted on a wavelength $\lambda_i$ from the other of said halves.

5. A transmission system according to claim 3, wherein the integer i takes all of the possible values in the range 1 to n.

6. A transmission system according to claim 1, including only one said means for reducing collision induced intensity distortions and phase jitter, disposed substantially in the middle of the transmission system.

7. A transmission system according to claim 1, including a plurality of means for reducing collision induced intensity distortions and phase jitter, spaced apart along the transmission system.

8. A method of transmitting pulsed optical signals using wavelength division multiplexing, said method including a step for reducing collision-induced intensity distortions and phase jitter by performing at least one wavelength interchange step in which the wavelengths of at least two channels are interchanged, so as to change the sign of the residual frequency variation induced by asymmetrical collisions on the signals of said channels.

9. A method according to claim 8, wherein the wavelengths of the various channels of the multiplex constitute a set comprising a bottom half and a top half, and wherein the interchange step takes place such that the signals transmitted on a wavelength from one of said halves are transmitted on a wavelength from the other of said halves.

10. A method according to claim 9, wherein the interchange step comprises interchanging the wavelengths in a manner such that the signals transmitted on a wavelength $\lambda_i$ from one of said halves are transmitted on a wavelength $\lambda_{n-i+1}$ from the other of said halves, where i is an integer taking at least one value in the range 1 to n.

11. A method according to claim 10, wherein the interchange step further comprises interchanging the wavelengths in a manner such that the channels transmitted on a wavelength $\lambda_{n-i+1}$ from one of said halves are transmitted on a wavelength $\lambda_i$ from the other of said halves.

12. A method according to claim 10, wherein the integer i takes all of the possible values in the range 1 to n.

13. A method according to claim 8, comprising only a single said interchange step which takes place after substantially one-half of the propagation time.

14. A method according to claim 8, comprising a plurality of said interchange steps.

15. A wavelength interchange device, comprising:

multiplexer means for demultiplexing a wavelength division multiplex of pulsed optical signals, which means deliver a plurality of channels at wavelengths, said wavelengths constituting a set formed by a bottom half and by a top half;

at least two wavelength converters for interchanging the wavelengths of a channel chosen from one of said halves and the wavelength of a channel chosen from the other of said halves; and multiplexer means for re-multiplexing the channels;

said device including 2·Int(n/2) converters, where n is the number of channels.

16. A method of interchanging wavelengths in a wavelength division multiplex of pulsed optical signals, the wavelengths ($\lambda_i$, where i is an integer lying in the range 1 to n) constituting a set formed by a bottom half and by a top half, said method comprising:

demultiplexing the channels of the multiplex;

interchanging the wavelengths of at least one channel chosen from one of said halves and of at least one channel chosen from the other of said halves; and re-multiplexing the channels;

wherein the integer i takes all of the values in the range 1 to Int(n/2), where n is the number of channels.

17. A device for interchanging wavelengths within a wavelength division multiplex of pulsed optical-signals, the wavelengths of the multiplex constituting a set formed by a bottom half and by a top half, said device comprising:

means for separating the multiplex into first and second signals, the first signal comprising the channels whose wavelengths belong to one half, and the second signal comprising the channels whose wavelengths belong to the other half;

first conversion means for converting the wavelengths of the channels of the first signal into wavelengths of said other half;

second conversion means for converting the wavelengths of the channels of the second signal into wavelengths of said one half;.and combination means for combining the signals delivered by said first and second conversion means.

18. A device according to claim 17, wherein said first and second conversion means comprise four-wave mixers for conjugating the signals about a middle frequency $(\lambda_1+\lambda_n)/2$ midway between the end frequencies of the multiplex.

19. A device according to claim 18, wherein said first conversion means further comprise filters for filtering wavelengths other than those of said other half and said second conversion means further comprise filters for filtering wavelengths other than those of said one half, or vice versa.

20. A method of interchanging wavelengths within a wavelength division multiplex of pulsed optical signals, the wavelengths of the multiplex constituting a set formed by a bottom half and by a top half, said method comprising:

a step of separating the multiplex into first and second signals, the first signal comprising the channels whose wavelengths belong to one-half, and the second channel comprising the channels whose wavelengths belong to the other half;

a step of converting the wavelengths of the channels of the first signal into wavelengths of said other half;

a step of converting the wavelengths of the channels of the second signal into wavelengths of said one half; and a step of combining the first and second signals as converted.

21. A method according to claim 20, wherein the conversion step comprises conversion by four-wave mixing to conjugate the signals about a middle frequency $(\lambda_1+\lambda_n)/2$ midway between the end frequencies of the multiplex.

22. A device according to claim 21, wherein the conversion step further comprises a filtering step after the four-wave mixing step.

* * * * *